(12) United States Patent
Thibodeau

(10) Patent No.: US 9,133,996 B2
(45) Date of Patent: Sep. 15, 2015

(54) EMERGENCY VEHICLE LIGHT WITH ILLUMINATED BEZEL

(71) Applicant: Code 3, Inc., St. Louis, MO (US)

(72) Inventor: Mark Thibodeau, St. Louis, MO (US)

(73) Assignee: Code 3, Inc., St. Louis, MO (US)

( * ) Notice: Subject to any disclaimer, the term of this patent is extended or adjusted under 35 U.S.C. 154(b) by 203 days.

(21) Appl. No.: 13/795,787

(22) Filed: Mar. 12, 2013

(65) Prior Publication Data

US 2013/0272007 A1 Oct. 17, 2013

Related U.S. Application Data

(60) Provisional application No. 61/625,216, filed on Apr. 17, 2012.

(51) Int. Cl.
*B60Q 1/00* (2006.01)
*F21S 8/10* (2006.01)
*B60Q 1/26* (2006.01)

(52) U.S. Cl.
CPC ............. *F21S 48/00* (2013.01); *B60Q 1/2611* (2013.01)

(58) Field of Classification Search
CPC .......... B60Q 1/00; B60Q 1/0041; B60Q 1/02; B60Q 1/26; B60Q 3/00; B60Q 7/00; F21S 48/00; F21S 48/10; F21S 48/17; F21S 48/25; F21S 48/30; F21S 48/145
USPC ............ 362/23.07, 23.09, 23.1, 23.13, 23.16, 362/23.17, 23.2, 97.1–97.4, 135–137, 362/217.02, 217.14, 217.15, 219, 249.01, 362/249.02, 276, 310, 326–328, 351, 507, 362/538, 539, 545, 546, 611, 612, 615–618, 362/520–522; 349/57, 61, 62, 65
See application file for complete search history.

(56) References Cited

U.S. PATENT DOCUMENTS

| 6,267,488 | B1 * | 7/2001 | Muegge et al. | 362/509 |
| 8,582,282 | B2 * | 11/2013 | Kim et al. | 361/679.21 |
| 2008/0084705 | A1 * | 4/2008 | Helwig et al. | 362/507 |
| 2010/0309102 | A1 * | 12/2010 | Jung | 345/82 |

FOREIGN PATENT DOCUMENTS

| JP | 2005017232 A | * | 1/2005 |
| JP | 2007017168 A | * | 1/2007 |
| JP | 2009080145 A | * | 4/2009 |

* cited by examiner

*Primary Examiner* — Hargobind S Sawhney
(74) *Attorney, Agent, or Firm* — Stoel Rives LLP

(57) ABSTRACT

A bezel for a light fixture appears illuminated when a bezel light source is energized and the bezel appears opaque when the bezel lights source is not energized. The bezel has a metalized coating which reflects light transmitted from a location remote from and external to the bezel and which transmits light emitted by the bezel light source.

21 Claims, 6 Drawing Sheets

EMERGENCY VEHICLE LIGHT WITH ILLUMINATED BEZEL

BACKGROUND OF THE INVENTION

The present invention generally relates to accent lighting for a vehicle and, in particular, a selectively illuminated bezel for a light mounted to an emergency vehicle such as a fire truck, ambulance or police vehicle.

SUMMARY

In one embodiment, a bezel is adapted to be mounted to a perimeter of a light source. The bezel forms a channel having a bezel light source therein. The bezel has a surface having a coating thereon which reflects light transmitted from a location remote from and external to the bezel and which transmits light emitted by the bezel light source.

In one embodiment, the invention comprises the bezel as noted above in combination with a light source, such as an emergency vehicle light source. The bezel and light are adapted to be mounted on the emergency vehicle.

Other objects and features will be in part apparent and in part pointed out hereinafter.

BRIEF DESCRIPTION OF THE DRAWINGS AND APPENDICES

Figure 1:
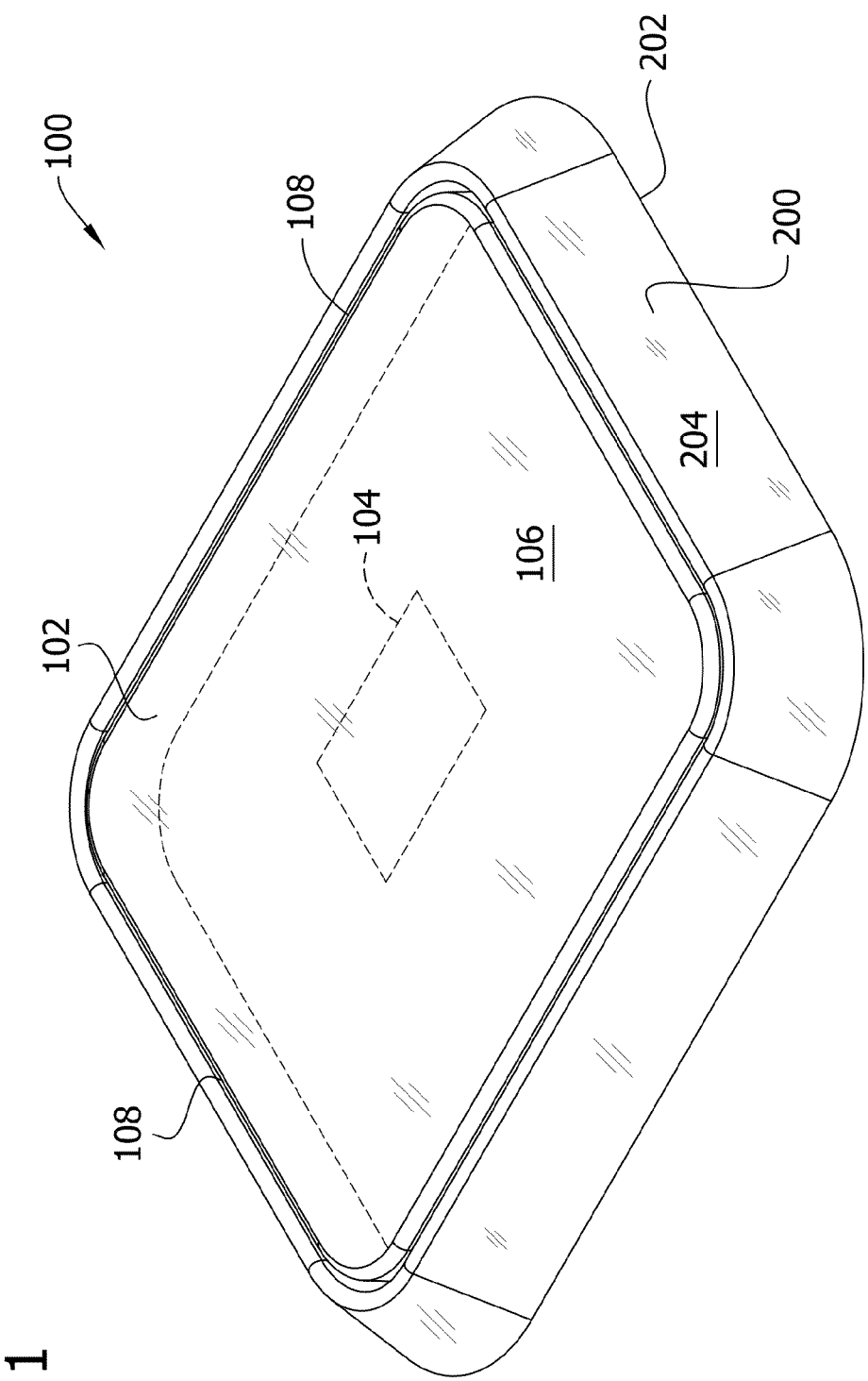
FIG. 1 is a perspective view of a light and bezel of one embodiment of the invention.

Appendix 1 provides the specifications for one example of a base coating.

Appendix 2 provides the specifications for one example of a clear coating.

Corresponding reference characters indicate corresponding parts throughout the drawings.

DETAILED DESCRIPTION

Figure 3:
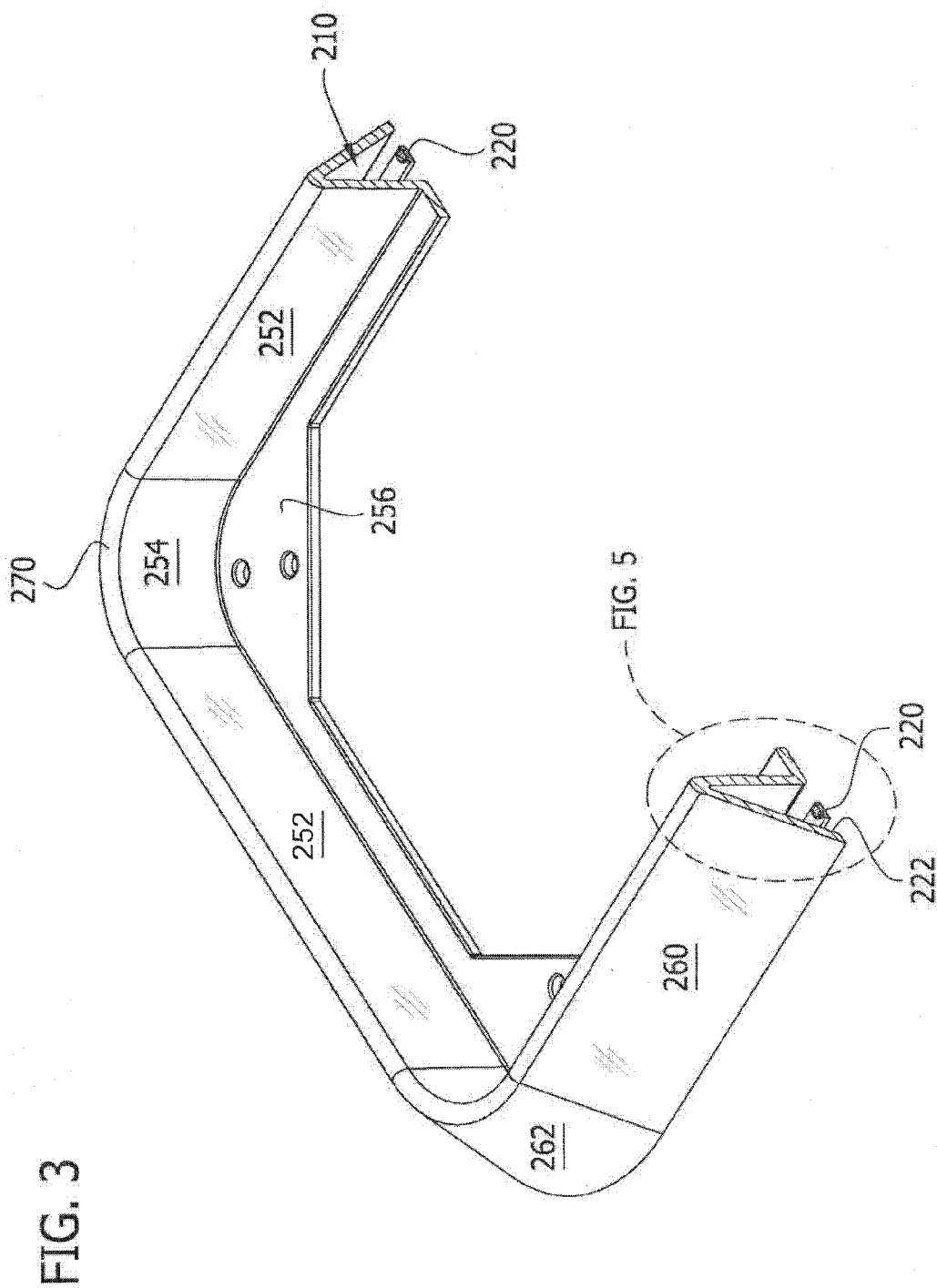
FIG. 3 is a cross-sectional view along lines 3-3 of FIG. 2.
Figure 4:
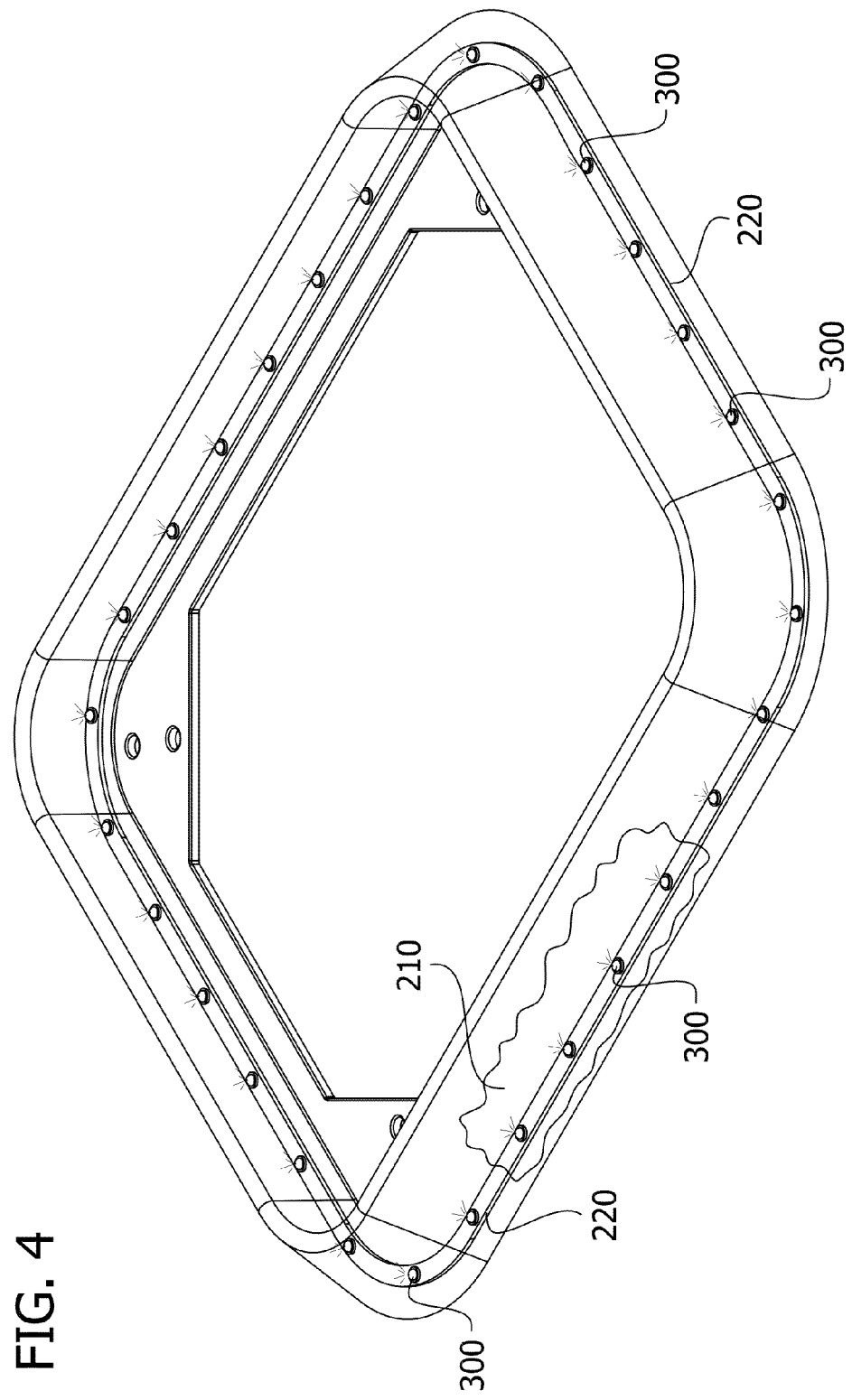
FIG. 4 is a perspective view of the bezel of FIG. 2 with LEDs energized and with part of the bezel broken away to illustrate the LED bezel light sources within the channel formed by the bezel, according to one embodiment of the invention.

In one embodiment, the present invention is a light 100 as shown in FIG. 1 including a light fixture in combination with a bezel 200 surrounding the light fixture. In one embodiment, the light fixture comprises a housing 102 having a light source 104 (shown in phantom) covered by a lens 106 and having a perimeter 108. A bezel 200 adapted to be adjacent to, engaging or mounted to the perimeter 108. As shown in FIGS. 3 and 4, the bezel forms a channel 210 having a bezel light source 220 therein. The bezel 200 has an exterior surface 202 having a coating 204 thereon which reflects light transmitted from a location remote from and exterior to the bezel 200 and which transmits light emitted by the bezel light source 220. Alternatively, the coating 204 of the bezel 200 may be on an interior surface 222. In one embodiment, the light fixture is an emergency or warning light adapted for use on an emergency vehicle. For example, the light fixture and associated bezel 200 may be mounted on an exterior or other surface of an emergency vehicle such as a fire truck, ambulance or police vehicle. In one embodiment, the light fixture may be a scene light mounted on an ambulance.

Figure 2:
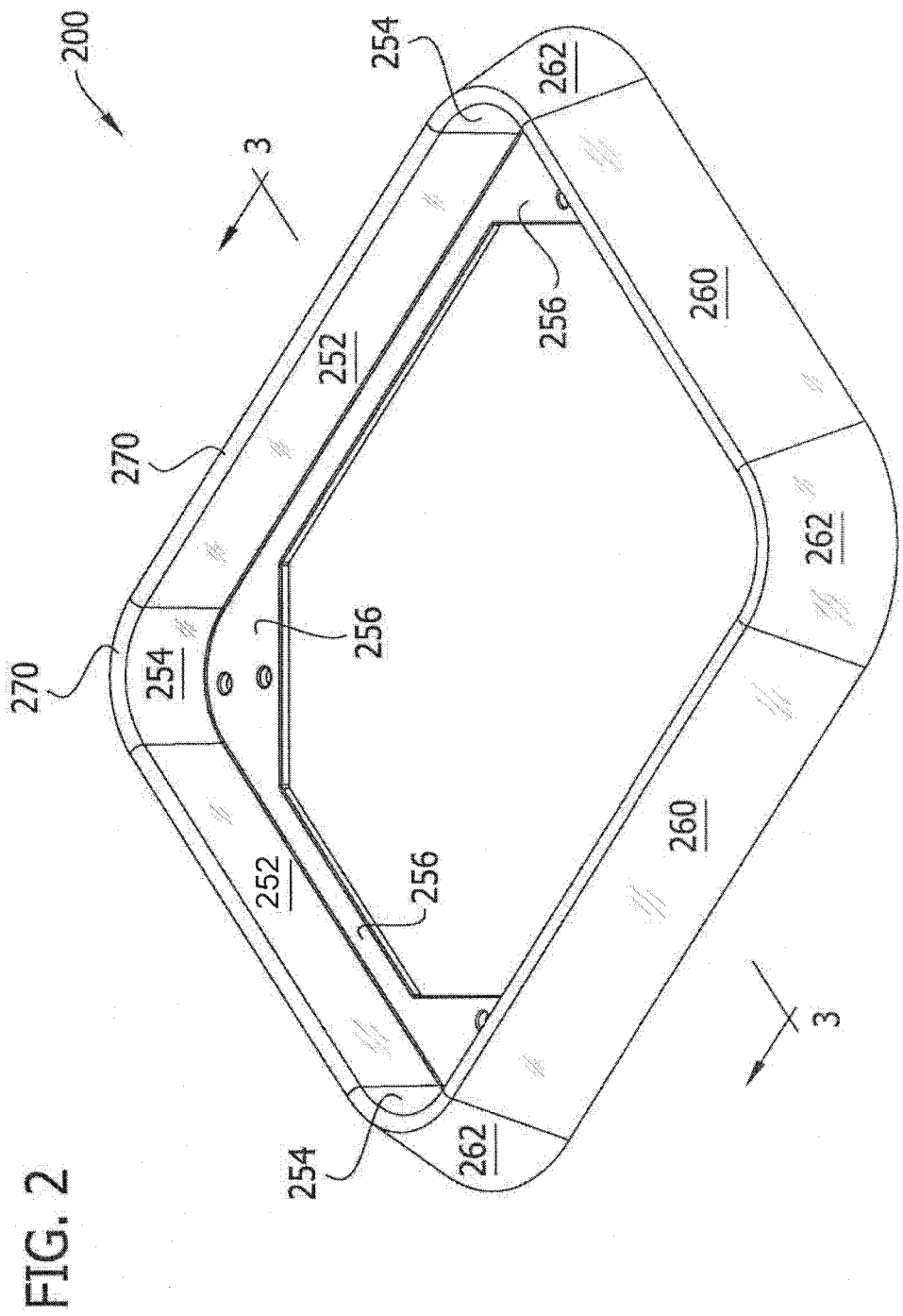
FIG. 2 is a perspective view of a bezel of FIG. 1.

FIG. 2 is a perspective view of one embodiment of the bezel 200 of FIG. 1. Planar interior rectangular walls 252 are joined by interior cylindrical wall sections 254 to form a rectangular ring for receiving the light fixture. A flange 256 may be connected to the walls 252 and sections 254 for supporting the light fixture and/or for mounting the bezel 200 to a vehicle (not shown). Exterior parts of the bezel 200 include planar inclined rectangular panels 260 joined by frusto-conical sections 262. The panels 260 and sections 262 are joined to the walls 252 and sections 254, respectively, by an edge 270. As shown in FIGS. 2-4, an underside of the bezel 200 defines the channel 210 for receiving the bezel light source 220.

Referring to FIGS. 3 and 4, the bezel light source 200 comprises light emitting diodes (LEDs) 300 within the channel 210 formed by the walls and sections of the bezel 200.

Figure 5:
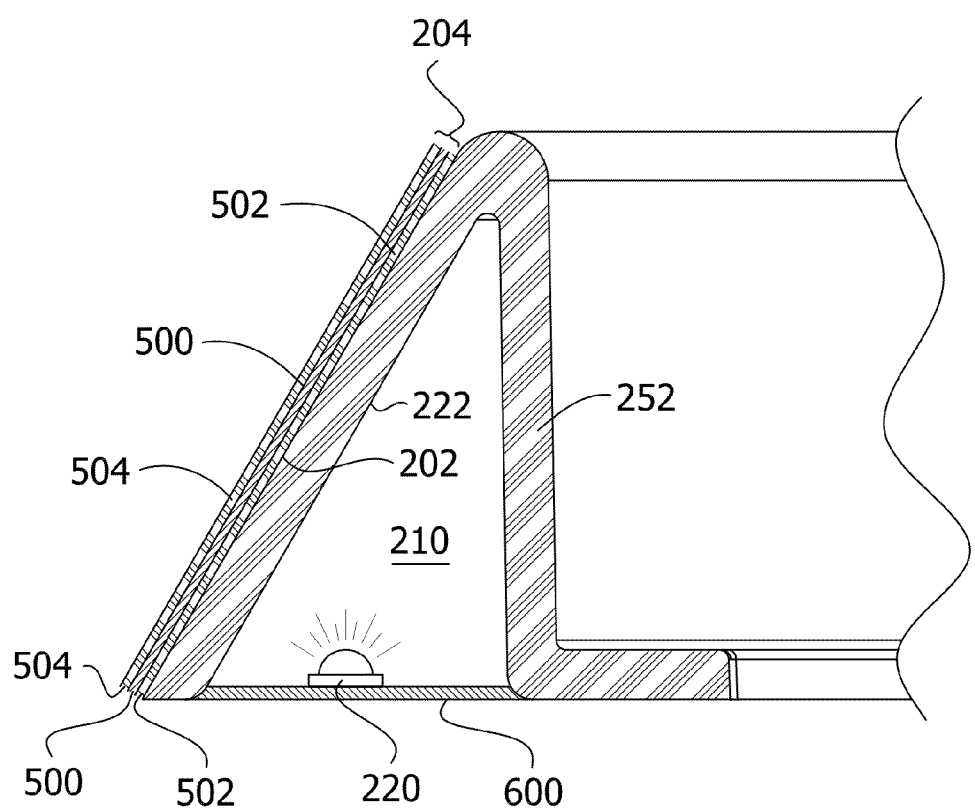
FIG. 5 is an expanded plan view of a cross-sectional portion of FIG. 3.

Referring to FIG. 5, the coating 204 comprises a vacuum metalized coating 500 comprising an aluminum material vaporized and deposited on the surface 202 of the bezel 200. Thus, in one form, the surface 202 of the bezel comprises a half-silvered surface.

The coating 204 has an opaque appearance when the bezel light source 220 is not energized so that the bezel 200 appears to an observer to be a reflective surface. In other words, when the bezel light source 220 is not energized, the coating 204 reflects ambient light.

The coating 204 has a translucent appearance when the bezel light source 220 is energized so that the bezel 200 appears to an observer remote from the bezel to be illuminated by light from the bezel light source 220. In other words, when the bezel light source 220 is energized, the coating transmits light generated by the bezel light source 220. To some extent, the coating 204 also reflects ambient light when the bezel light source 220 is energized; however, the intensity of the transmitted light is usually greater than the intensity of the reflected light so that the reflected light is generally not notice by an observer.

Figure 6:
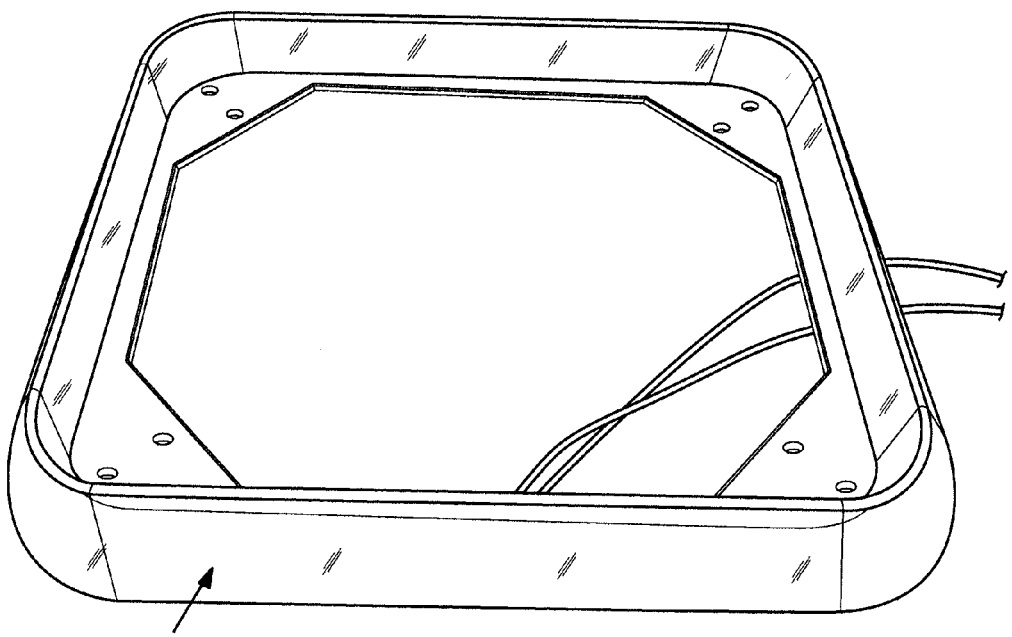
FIG. 6 is a photo of a perspective view of a bezel of one embodiment of the invention without the bezel light source illuminated.

FIG. 6 shows one embodiment of a perimeter light bezel of the invention as an observer would see it when its bezel light sources (not visible in FIG. 6) are not energized. Because of the reflective properties of the coating on the bezel, the bezel 600 appears as a metalized plastic giving it a "chrome finish".

Figure 7:
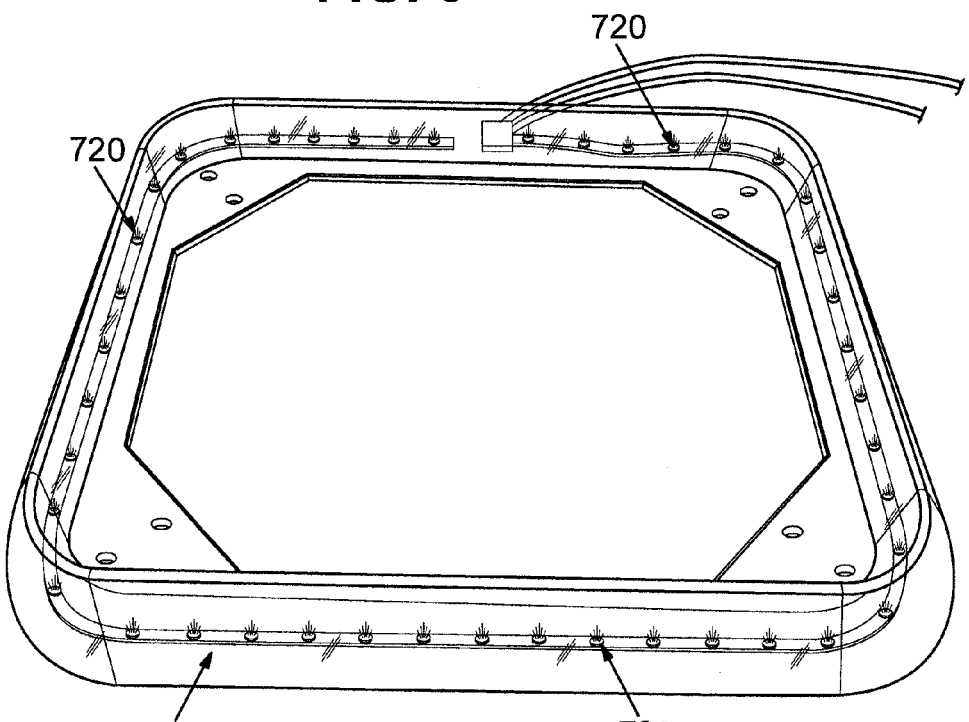
FIG. 7 is a photo of a perspective view of the bezel of FIG. 6 with the bezel light source illuminated.

FIG. 7 shows the bezel 700 of FIG. 6 with the bezel light sources 720 energized so the bezel 720 is illuminated. FIG. 7 shows one embodiment of a perimeter light bezel of the invention as an observer would see it when its bezel light sources 220 are energized. In this embodiment, an LED rope light was located within a channel (e.g., channel 210) formed by the bezel 700 and the rope light was illuminated. Because of the transmissive properties of the coating on the bezel 700, the bezel light source 720 is visible and illuminates the bezel 700 to create accent lighting.

The coating 204 may be the metalized coating 500 which is applied to a transparent or translucent plastic (e.g., polycarbonate) bezel 200 in such a manner as to create a "two way" mirror surface. Light is reflected by the coating 204 as long as there more light external to the bezel 200 than the light generated by the bezel light source 200. When the LEDs 300 are energized, light is transmitted through the bezel 200 since the light generated by the LEDs 300 has a greater intensity than that of the ambient light around the bezel 200.

In one embodiment, the process for applying a metalized coating 500 is vacuum metalizing, using an aluminum material that is vaporized in a chamber and deposits on the bezel 200. In most cases an optional base coat 502 material may be applied first to the surface 202 of the bezel 200, either by hand spraying or powder coating before the bezel 200 is metalized (see Appendix 1). Powder coating is the process of coating a surface in which a powder material is applied using an electrostatic or compressed air method. The applied powder is then heated (cured) to its melting point, after which it flows to form a smooth film which dries to a firm, durable finish resistant to scratches, cracking, peeling, UV rays and rust. After the metalized coating 500 is applied, the bezel 200 may be top coated with an optional clear coating 504 to protect the vacuum metalized coating 500 (see Appendix 2).

In one embodiment, the coating 204 acts as one-way mirror in the form of a reflective coating applied in a very thin, sparse layer—so thin that it is sometimes called a half-silvered surface. The name half-silvered comes from the fact that the reflective molecules coat the surface so sparsely that only a portion of the molecules needed to make the surface an opaque mirror are applied. At the molecular level, there are reflective molecules speckled all over the bezel surface 202 in an even film but only a portion (e.g., half) of the surface is covered. The half-silvered surface will reflect about half the light that strikes its surface, while letting the other half go straight through.

As shown in FIG. 5, the bezel light source 220 may be mounting to a base 600, such as a printed circuit board, connected to the walls and sections of the bezel 200. Alternatively, the bezel light source 220 may be mounted directed to a surface of the vehicle. Alternatively, the bezel light source 220 may be mounted to a base mounted to the vehicle surface or to the light fixture within the bezel 200. Alternatively, the bezel light source 220 may be attached to interior surface of the wall 252. Alternatively, the bezel light source 220 may be a rope LED that is attached to the vehicle or within the channel 210 by double sided tape.

The thickness of the coating may vary, but typically it is less than a mil.

The LEDs 300 may be illuminated (flashing, pattern, sequence or steady burn) whenever an operator chooses. For example, the LEDs 300 may be wired independently from a lighting circuit of a vehicle on which the light is mounted. A separate switch may be used to selectively activate the LEDs 300 in response to an operator. As another example, the LEDs 300 may be wired and energized when the vehicle ignition is energized or when the vehicle lights are energized. In one embodiment, the bezel light source is LEDs 300; however, any type of lamp or light source which fits within the channel of the bezel may be used. As another example, the LEDs 300 may be wired and energized when warning or emergency lighting of the vehicle is energized. In this latter example, the LEDs 300 may be synchronized to the warning or emergency lighting, such as by flashing the LEDs 300 in the same pattern as that of, or a substantially similar pattern to the warning or emergency light. Alternatively, the LEDs 300 may be operated independently of the warning or emergency lighting. Thus, the LEDs 300 may be energized when the vehicle ignition is energized or when other lights of the vehicle lights are energized. In addition, the LEDs 300 may be illuminated independently of the light source 104, the LEDs 300 may be illuminated simultaneously with the light source 104, and/or the LEDs 300 may be illuminated only when the light source 104 is not illuminated. In one form, the light source 104 is a plurality of LEDs. Also, the light source 104 and LEDs 300 may be the same or different colors. Also, the LEDs 300 may all be the same color or different colors. It is also contemplated that some or all of the LEDs 300 may be illuminated at a particular time.

Although it is contemplated that the bezel would be an integral part of an emergency warning light, it is also contemplated that the bezel may be manufactured and sold separately and independent of a light source which would fit within the bezel. Also, the bezel may be part of any light for a vehicle other than an emergency warning light. It is contemplated that the invention may be implemented in other forms of lighting other than bezels. For example, a chrome piece on a vehicle such as trim or grill work may have metalized coating 500 and be backlit by a light source. Thus, in one embodiment the invention comprises a light for a vehicle comprising a housing having a light fixture and an additional housing (e.g., a bezel) adapted to be mounted adjacent to the light fixture and forming a channel having a light source therein. The additional housing has a surface having a coating thereon which reflects light transmitted from a location remote from and external to the additional housing and which transmits light emitted by the light source.

Although an optional dichroic coating may be used as the coating, the coating 204 does not have to have dichroic properties.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention is capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

APPENDIX 1

Example of Optional Base Coating 502
5610K017—General Purpose Metallizing Basecoat A.P.NONWEILER'S GENERAL PURPOSE BASECOAT ADHERES TO A WIDE VARIETY OF SUBSTRATES, AND IT CAN BE APPLIED IN MANY WAYS. THIS COATING HAS EXCELLENT FLOW CHARACTERISTICS, WHEN REDUCED WITH THE PROPER SOLVENTS FOR THOSE JOBS ON POROUS SUBSTRATES. WHEN REDUCED PROPERLY IT CAN BE USED OVER ITSELF AS A TOPCOAT. THE CURE CYCLE VARIES ACCORDING TO THE MIL THICKNESS APPLIED. MOST FLOWCOAT APPLICATIONS REQUIRE A FLASH OFF TIME OF 15 MINUTES BEFORE A 60 MINUTE BAKE AT 160 DEGREES F.

SPECIFICATIONS:
VISCOSITY: 52 SEC. #2 ZAI-IN
WEIGHT/GALLON: 7.47
SPECIFIC GRAVITY: 0.90 GRAMS PER MILLILITER
SOLIDS BY WEIGHT: 45%
SOLIDS BY VOLUME: 52%
VOC: 4.06 LBS.\GAL.
REDUCTION SCHEDULE:
FLOWCOAT: REDUCE 3 PARTS SOLVENT BLEND TO 1 PART COATING. THE SOLVENT BLEND CAN BE VM&P NAPTHA, HEPTHANE OR COMBINATION THEREOF, WITH A SMALL AMOUNT OF MINERAL SPIRITS OR BUTYL CELLUSOL VE\EB TO BOOST FLOW.
SPRAY: REDUCE WITH 2 PARTS VM&P NAPTHA OR HEPTHANE TO 1 PART COATING.
CURING SCHEDULE:
FLASH OFF 15 MIN. FOLLOWED BY A 1.5 HR BAKE@ 165 F.

APPENDIX 2

Example of Optional Clear Coating 504:
4225SJ33—Polyurethane Metallizing Topcoat OIL MODIFIED POLYURETHANE TOPCOAT HAS EXCELLENT ADHESION, MAR RESISTANCE AND GLOSS. UV INHIBITORS MAY BE ADDED TO THE PRODUCT TO INHIBIT YELLOWING. IT CAN BE FLOWCOATED, DIP COATED, SPRAYED, ROLLER OR BRUSH COATED.

SPECIFICATIONS:
VISCOSITY: 19 SEC. #2 ZAHN
WEIGHT/GALLON: 7.15
SPECIFIC GRAVITY: 0.858 GRAMS PER MILLILITER
SOLIDS BY WEIGHT: 35.5%
SOLIDS BY VOLUME: 27.24%
VOC: 4.49 LB.\GAL.
REDUCTION SCHEDULE:
REDUCTION CAN BE MADE USING MINERAL SPIRITS, VM&P NAPTHA, OR LACOLENE.
CURING SCHEDULE:
FLASH OFF 15 MIN. FOLLOWED BY A 1 HR BAKE@ 150 F.
TYPICAL PROPERTIES:
TACK FREE: 2 HRS. @ 77° F.
SWARD HARDNESS: (1 WEEK) 40
TABER ABRASION RESISTANCE: 50

What is claimed is:

1. A light for a vehicle, comprising:
a housing containing a light fixture and having a perimeter;
a bezel in the form of a ring that has an interior region shaped to receive the light fixture and that is configured for attachment to the housing, the bezel including exterior and interior walls having upper and lower side margins defined by the ring form of the bezel, the perimeter of the housing being adjacent to the interior wall, the upper side margins of the exterior and interior walls joined to form an upper side edge, and the lower side margins of the exterior and interior walls spaced apart to form an underside channel having a length defined by an extent of the bezel ring;
a bezel light source positioned to emit light into and along the length of the channel and thereby illuminate the bezel when the bezel light source is energized; and
a coating on a surface of one of the exterior and interior walls of the bezel, the coating reflecting light transmitted from a location remote from and external to the bezel and transmitting light emitted by the bezel light source.

2. The light of claim 1 wherein the bezel light source comprises light emitting diodes (LEDs).

3. The light of claim 2 wherein the light is mounted to a vehicle and the LEDs are energized when the vehicle ignition is energized or when other lights of the vehicle lights are energized.

4. The light of claim 1 wherein the coating comprises a vacuum metalized coating comprising an aluminum material vaporized and deposited on the surface of the bezel.

5. The light of claim 1 wherein at least one of:
the surface of the bezel comprises a half-silvered surface;
the surface of the bezel includes a base coat between the coating and the surface; or the coating has a clear coat thereon.

6. The light of claim 1 wherein the coating has an opaque appearance when the bezel light source is not energized so that the bezel appears to an observer to be a reflective surface.

7. The light of claim 6 wherein the coating has a translucent appearance when the bezel light source is energized so that the bezel appears to an observer to be illuminated by light from the bezel light source.

8. The light of claim 1 wherein the light fixture comprises a scene light or comprises an emergency light adapted for use on an emergency vehicle.

9. An apparatus for use with a light fixture for an emergency vehicle, the light fixture having a perimeter, comprising a bezel in the form of a ring that has an interior region shaped to receive the light fixture and that is configured for attachment to the housing, the bezel including exterior and interior walls having upper and lower side margins defined by the ring form of the bezel, the perimeter being adjacent to the interior wall, the upper side margins of the exterior and interior walls joined to form an upper side edge, and the lower side margins of the exterior and interior walls spaced apart to form an underside channel having a length defined by an extent of the bezel ring;
   a bezel light source positioned to emit light into and along the length of the channel and thereby illuminate the bezel when the bezel light source is energized; and
   a coating on a surface of one of the exterior and interior walls of the bezel, the coating reflecting light transmitted from a location remote from and external to the bezel and transmitting light emitted by the bezel light source.

10. The apparatus of claim 9 wherein the bezel light source comprises light emitting diodes (LEDs).

11. The apparatus of claim 10 wherein the light is mounted to a vehicle and the LEDs are energized when the vehicle ignition is energized or when other lights of the vehicle lights are energized.

12. The apparatus of claim 9 wherein the coating comprises a vacuum metalized coating comprising an aluminum material vaporized and deposited on the surface of the bezel.

13. The apparatus of claim 9 wherein at least one of:
   the surface of the bezel comprises a half-silvered surface; the surface of the bezel includes a base coat between the coating and the surface; or the coating has a clear coat thereon.

14. The apparatus of claim 9 wherein the coating has an opaque appearance when the bezel light source is not energized so that the bezel appears to an observer to be a reflective surface.

15. The apparatus of claim 14 wherein the coating has a translucent appearance when the bezel light source is energized so that the bezel appears to an observer to be illuminated by light from the bezel light source.

16. The light of claim 9 wherein the light fixture comprises a scene light or comprises an emergency warning light adapted for use on an emergency vehicle.

17. A light for a vehicle, comprising:
   a housing containing a light fixture and having light emitting diodes (LEDs) and a perimeter, the housing adapted to mount to a vehicle and the LEDs energized when the vehicle ignition is energized or when other lights of the vehicle lights are energized;
   a bezel in the form of a ring that has an interior region shaped to receive the light fixture and that is configured for attachment to the housing, the bezel including exterior and interior walls having upper and lower side margins defined by the ring form of the bezel, the perimeter of the housing being adjacent to the interior wall, the upper side margins of the exterior and interior walls joined to form an upper side edge, and the lower side margins of the exterior and interior walls spaced apart to form an underside channel having a length defined by an extent of the bezel ring;
   bezel LEDs positioned to emit light into and along the length of the channel and thereby illuminate the bezel when the bezel LEDs are energized; and
   a coating on a surface of one of the exterior and interior walls of the bezel, the coating reflecting light transmitted from a location remote from and external to the bezel and transmitting light emitted by the bezel LEDs.

18. The light of claim 17 wherein the coating comprises a vacuum metalized coating comprising an aluminum material vaporized and deposited on the surface of the bezel.

19. The light of claim 18 wherein at least one of:
   the surface of the bezel comprises a half-silvered surface; the surface of the bezel includes a base coat between the coating and the surface; or the coating has a clear coat thereon.

20. The light of claim 18 wherein the coating has an opaque appearance when the bezel LEDs are not energized so that the bezel appears to an observer to be a reflective surface, and wherein the coating has a translucent appearance when the bezel LEDs are energized so that the bezel appears to an observer to be illuminated by light from the bezel LEDs.

21. The light of claim 18 wherein the light fixture comprises a scene light or comprises an emergency warning light adapted for use on an emergency vehicle.

* * * * *